T. L. STEFFEN.
WAGON BODY LINING.
APPLICATION FILED OCT. 17, 1910.
995,923.
Patented June 20, 1911.
2 SHEETS—SHEET 1.
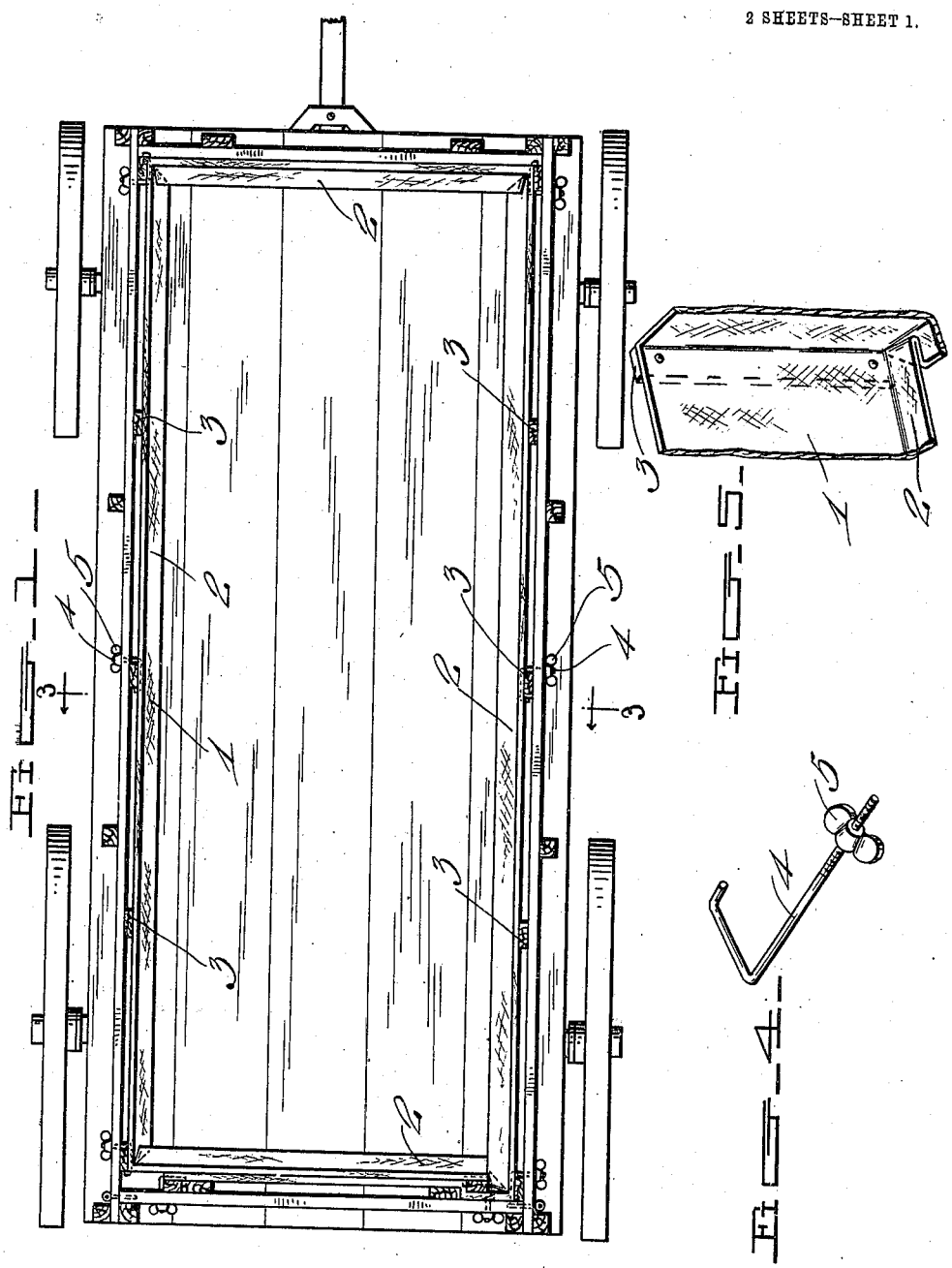
Witnesses
L. B. James
O. B. Hopkins
Inventor
T. L. Steffen
by H. B. Willson & Co.
Attorneys

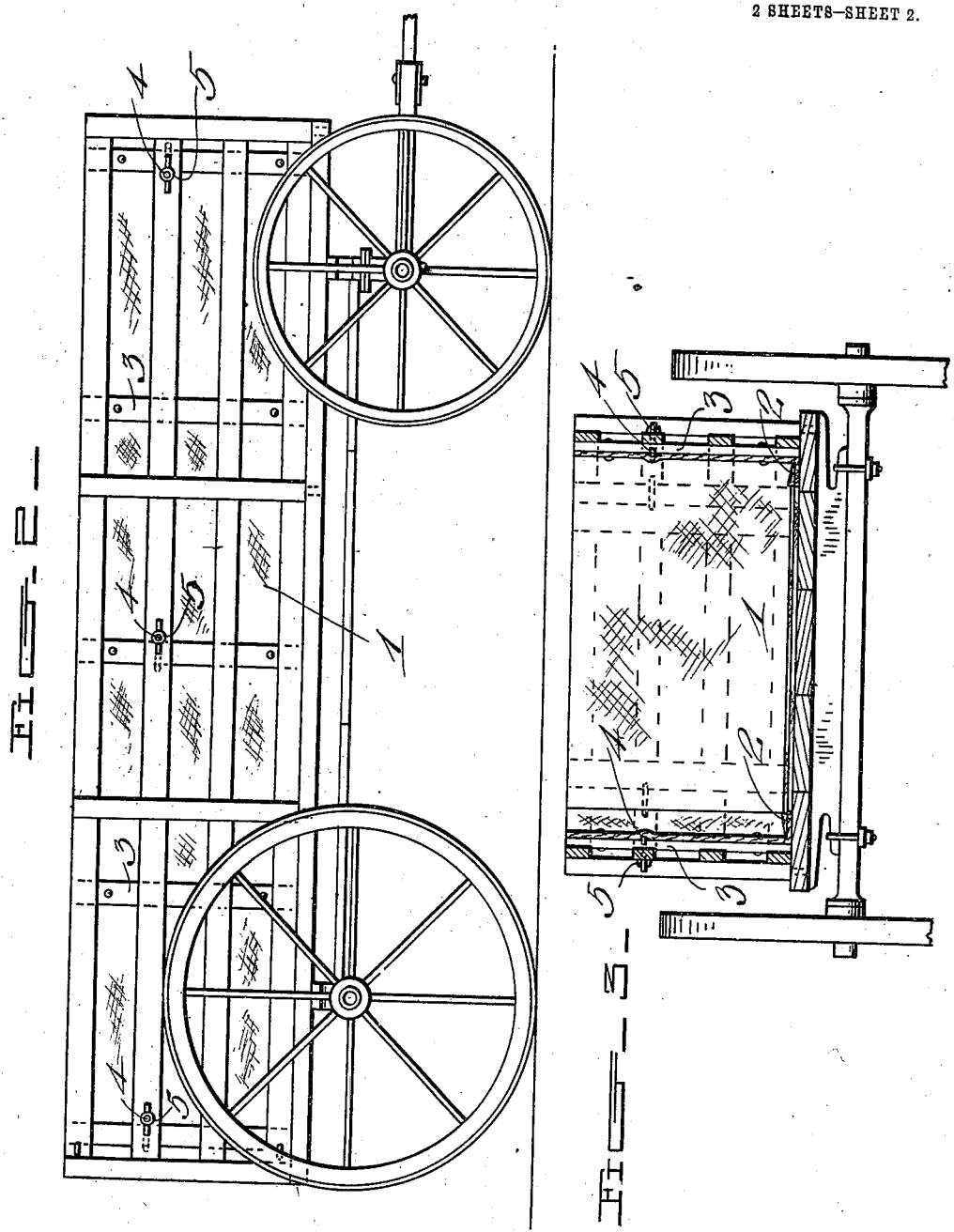

UNITED STATES PATENT OFFICE.

TOBIAS L. STEFFEN, OF BLUFFTON, INDIANA.

WAGON-BODY LINING.

995,923.  Specification of Letters Patent.  Patented June 20, 1911.

Application filed October 17, 1910. Serial No. 587,483.

*To all whom it may concern:*

Be it known that I, TOBIAS L. STEFFEN, a citizen of the United States, residing at Bluffton, in the county of Wells and State of Indiana, have invented certain new and useful Improvements in Wagon-Body Linings; and I do declare the following to be a full, clear, and exact description of the invention, such as will enable others skilled in the art to which it appertains to make and use the same.

This invention relates to improvements in linings for wagon bodies or racks.

One object of the invention is to provide a lining adapted to be engaged with the inner side of a wagon body or rack to close the openings therein thereby facilitating the use of the rack for holding grain or other material which would otherwise fall through the openings in the body or rack.

Another object is to provide a lining of this character having means whereby the same is supported in operative position in the wagon body or rack and means to detachably secure the lining to the rack.

In the accompanying drawings, Figure 1 is a plan view of a wagon body or rack showing the application of the invention thereto. Fig. 2 is a side view of the same. Fig. 3 is a vertical cross section on the line 3—3 of Fig. 1. Fig. 4 is a detail perspective view of one of the fastening devices for securing the lining in place. Fig. 5 is a detail view of one corner of the lining and one of the supporting bars thereof.

Referring more particularly to the drawings 1 denotes my improved wagon body lining which is formed of a strip of any suitable fabric or flexible material, said strip being of a width corresponding to the depth of the wagon body or rack to which the same is to be applied. The lower edge of the lining strip 1 is folded inwardly to a slight extent as shown at 2, said folded lower edge engaging the bottom of the wagon body whereby the grain or contents of the latter is prevented from working beneath the lining. The lining is preferably formed of one strip of material arranged around the inner side of the body or rack and having its ends overlapped at one end of the wagon body to such an extent as to prevent any possibility of the grain or contents of the wagon body from working between said ends.

The lining is held up and supported in operative position around the inner side of the sides and ends of the rack or wagon body by means of a series of supporting bars or cleats 3 which are arranged on the outer side of the lining between the same and the rack or body of the wagon and said lining is tacked or otherwise secured to the cleats or bars as shown.

The lining and the cleats 3 are detachably secured to the rack or body of the wagon by a series of fastening hooks 4, the inner ends of which are engaged with the cleats or bars 3. The outer ends of the hooks 4 project through apertures formed in the rails of the rack or sides of the wagon body and said projecting ends when threaded and have engaged therewith clamping nuts 5 which when screwed up on the threaded ends of the hooks, will draw the cleats 3 into tight engagement with the inner sides of the rack or wagon body and thus securely fasten the lining in place.

A wagon box or rack lining constructed and arranged in accordance with my invention may be readily engaged with and removed from the rack or body and thus provides means for quickly converting a rack into a suitable receptacle for containing grain or other material which would otherwise fall between the bars of the rack or through the cracks and holes in a wagon body. By providing the lining with the supporting cleats 3 the said lining is braced and is prevented from being pulled or forced through the spaces between the bars of the rack.

From the foregoing description taken in connection with the accompanying drawings, the construction and operation of the invention will be readily understood without requiring a more extended explanation.

What I claim is:

A detachable lining for slatted wagon bodies comprising a strip of flexible material adapted to be arranged around the inner sides of said body and having overlapping ends at one end of the body and provided on its lower edge with an inwardly disposed flange which is adapted to contact with the bottom of the wagon, said lining being spaced from the body, a series of vertical bars arranged at suitable distances apart and interposed between the lining and said body and secured to said lining, clamping bars having hooks on one end detachably connected around said bars said clamping bars having screw threads on their other ends which are inserted through apertures in the wagon body, and clamping nuts on said screw threaded ends so as to draw the vertical bars in contact with the inner sides of the wagon body to fasten the lining in proper position.

In testimony whereof I have hereunto set my hand in presence of two subscribing witnesses.

TOBIAS L. STEFFEN.

Witnesses:
ED. NEUENSCHWANDER,
GEORGE WEIST.